(No Model.)

H. GREEN.
SPIRIT LEVEL.

No. 438,541. Patented Oct. 14, 1890.

Witnesses:

Inventor:
Henry Green,
By James Sheehy
Attorney.

UNITED STATES PATENT OFFICE.

HENRY GREEN, OF UNIONVILLE, CONNECTICUT.

SPIRIT-LEVEL.

SPECIFICATION forming part of Letters Patent No. 438,541, dated October 14, 1890.

Application filed March 27, 1889. Serial No. 305,039. (No model.)

*To all whom it may concern:*

Be it known that I, HENRY GREEN, of Unionville, in the county of Hartford and State of Connecticut, have invented new and useful Improvements in Carpenters' Spirit-Levels; and I do hereby declare that the following is a full, clear, and exact description of the same.

This invention has relation to improvements in spirit-levels; and it has for its object to provide means for indicating the point of the bulb at any desired angle of inclination or level.

The invention will be fully understood from the following description and claims, when taken in connection with the accompanying drawings, in which—

Figure 1:
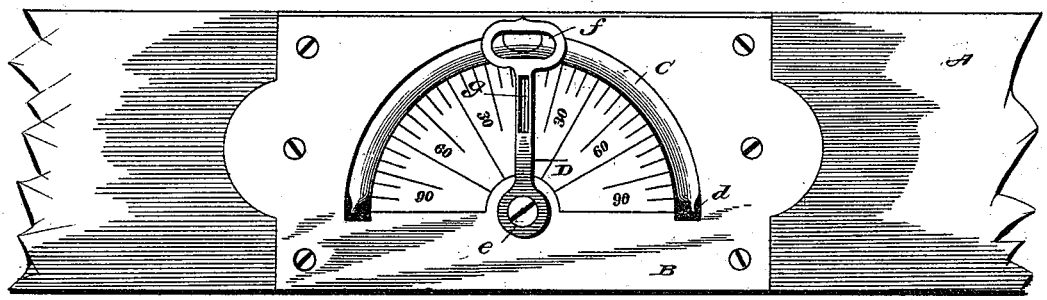
Figure 2:
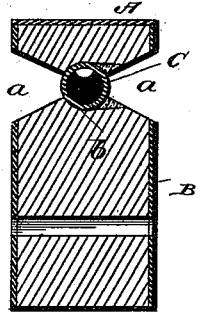
Figure 3:
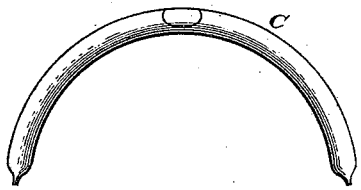
Figure 4:
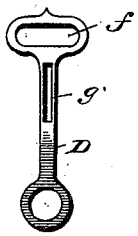

Figure 1 is a side view of a level with my improvements applied and the stock or body portion partly broken away. Fig. 2 is a transverse vertical sectional view. Fig. 3 is a view of the glass removed, and Fig. 4 is a view of the indicator removed.

Referring by letter to the said drawings, A indicates the stock or body of a level, which may be of any ordinary or approved construction. This stock or body portion is provided about midway of its length and on opposite sides with recesses *a*, which are of a semicircular or curvilinear form to correspond with the shape of the glass, and which are designed to expose to view the glass from opposite sides of the level and also the spirit therein. The body or stock of the level is provided at the inner ends of the recesses *a* with a groove *b* to seat the glass, and the said glass may be secured in position by plaster-of-paris or other suitable material.

Secured to one side of the body A is a plate B, which is provided with a semicircular slot *d*, corresponding in outline to that of the glass. This plate is suitably graduated, as shown.

C indicates the glass carrying the bulb or spirits. This glass, which is of a semicircular or curvilinear form, is designed to be seated in the body of the level, so that it can be viewed from opposite sides of the stock, as better shown in Fig. 2 of the drawings.

D indicates a pointer or indicator. This indicator is of a peculiar construction, being held at its lower end to the plate or body of the stock by a pivot-screw *e*, and its opposite or upper end is provided with an eye *f*, so that when the bulb in the glass reaches a point coincident with the eye it may be seen from either side of the level. This indicator is also provided at a suitable point below the eye with a slot or aperture *g*, which is designed to expose to view the marks or graduations upon the plate B.

This device is cheap in construction. It is durable and effective in operation.

In operation it will be seen that the indicator may be moved to any desired point upon the graduated plate, so as to expose to view from the slot *g* therein the number over which it is placed. Therefore when the bulb has come to a point within the eye of the indicator it will show the angle of the surface upon which the level is placed, and I attach importance to the fact that the level may be used from either side, it being simply necessary to set the indicator at the angle desired.

Having described my invention, what I claim is—

1. As an improved article of manufacture, a spirit-level having sight-apertures on opposite sides leading to the bulb, a graduated plate on one side of the bulb, and a pivoted indicator adapted to move over the graduated plate and having an eye to expose to view the bulb or spirit, substantially as specified.

2. In a spirit-level, the combination, with the stock or body having sight-apertures in opposite sides leading to the bulb, of a pivoted indicator having an eye at one end to expose to view therein the bulb or spirit, substantially as specified.

3. In a spirit-level, the combination, with the stock or body having a curvilinear recess in one of its side walls leading to the bulb, of the bulb or glass arranged in said recess and a pivoted indicator having an eye at one end, whereby the bulb may be exposed to view therein, substantially as specified.

4. In a spirit-level, the combination, with the body having a curvilinear recess, of a bulb or glass arranged at the inner end of said recess, a graduated plate having a slot conforming to the shape of the bulb and recess, and a pivoted indicator having an eye adapted to expose to view the bulb, and a slot or aperture to expose to view the graduations on the plate, substantially as specified.

HENRY GREEN.

Witnesses:
JOHN L. ALLEN,
HERMAN K. VOS BURGH.